Dec. 29, 1942.     A. SIMMON     2,306,666
MULTICOLOR LIGHT SOURCE FOR PHOTOGRAPHIC ENLARGERS
Filed Dec. 14, 1940     2 Sheets-Sheet 1
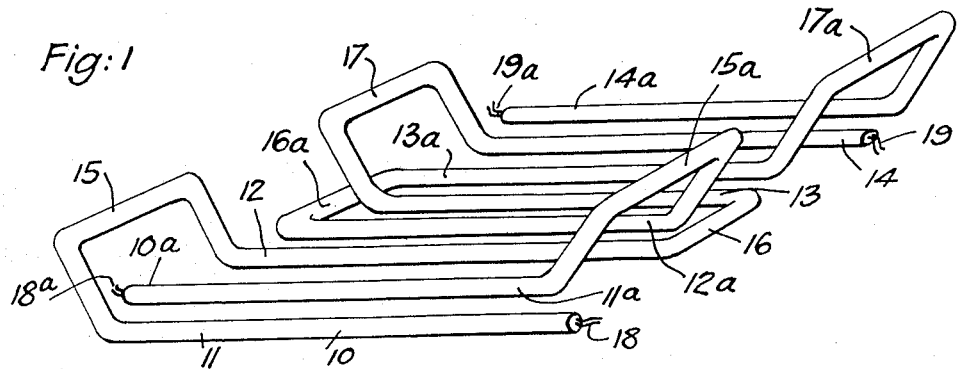
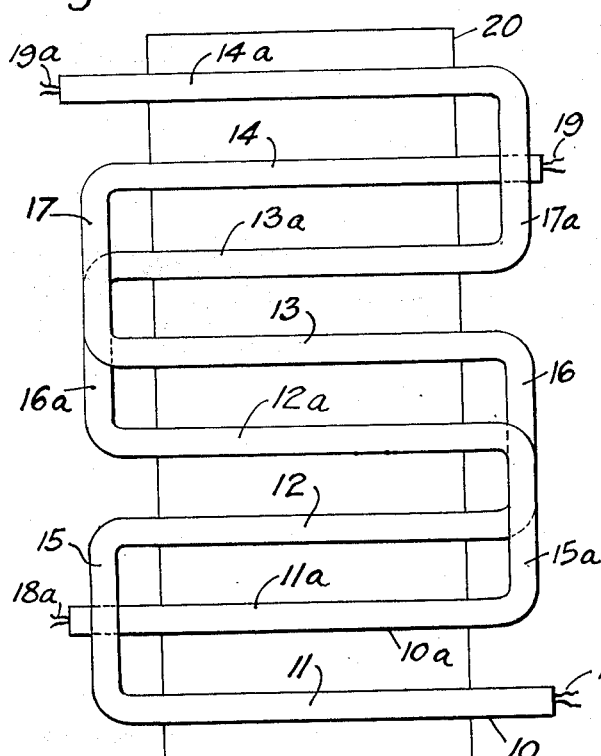
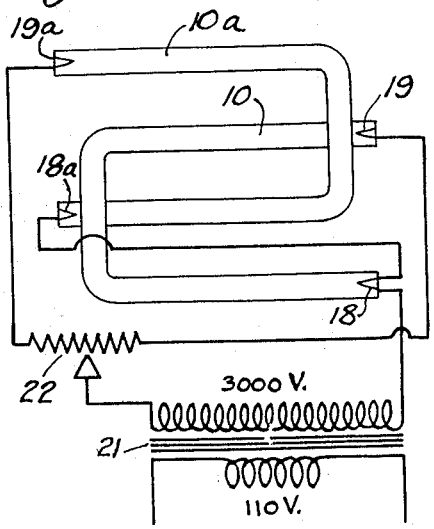
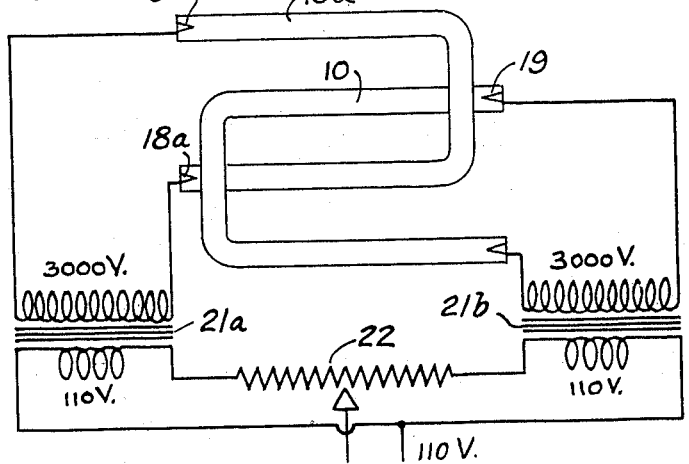
Alfred Simmon
INVENTOR.
BY Walter E. Wollheim
ATTORNEY.

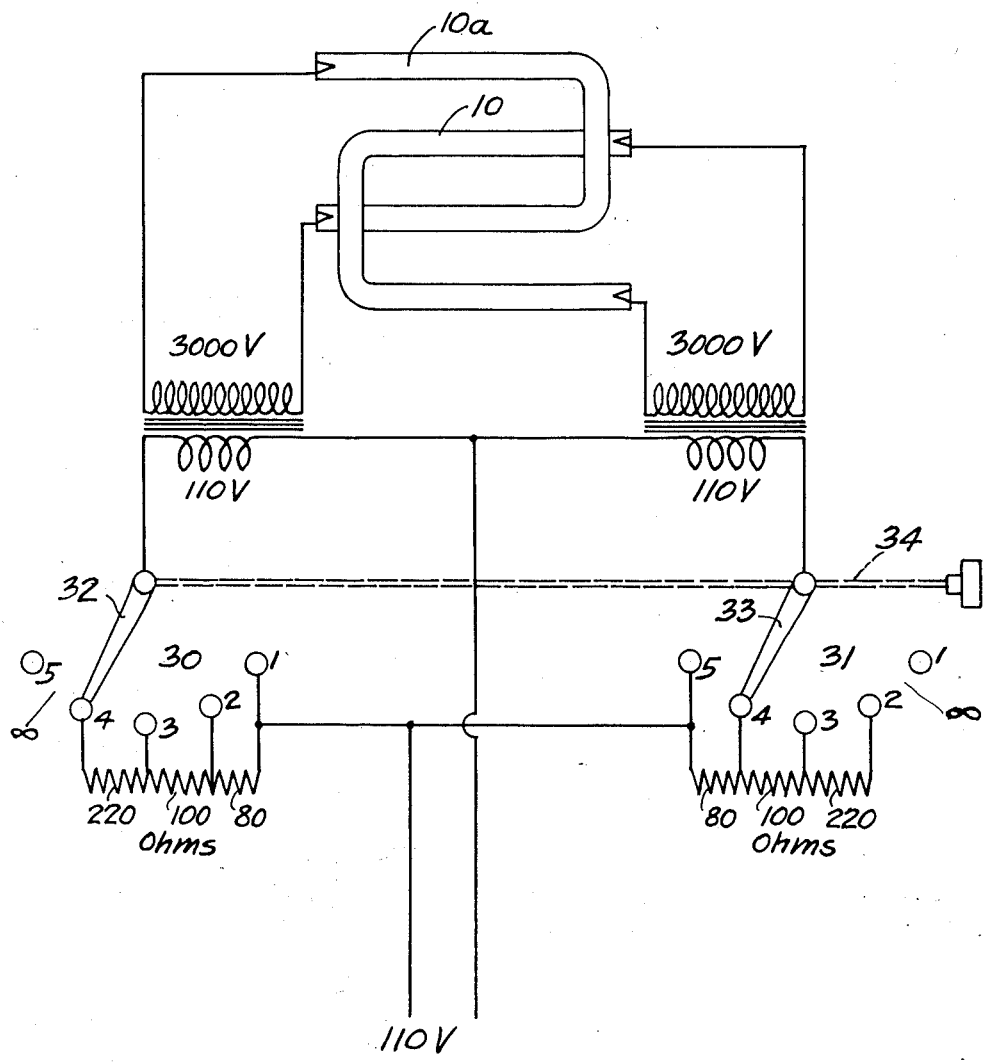

Patented Dec. 29, 1942

2,306,666

UNITED STATES PATENT OFFICE 2,306,666

MULTICOLOR LIGHT SOURCE FOR PHOTOGRAPHIC ENLARGERS

Alfred Simmon, Jackson Heights, N. Y., assignor to Simmon Brothers, Inc., Long Island City, N. Y., a corporation of New York Application December 14, 1940, Serial No. 370,169

4 Claims. (Cl. 176—124)

This invention relates to a control system for multi-colored illumination for photographic enlargers.

Printing paper has been developed lately which is capable of delivering prints of enlarged negatives in any degree of contrast from extremely hard to extremely soft, depending upon the wave lengths of light to which it is being exposed. With blue light, for instance, a very high contrast is obtained, while with green light, for instance, the graduation is very soft. Any mixture of the two colors will produce a corresponding intermediate contrast.

With existing enlargers, this paper is used in conjunction with filters. Two procedures have been proposed. The first one uses two filters, a blue and a yellow one and exposes the print for a suitable length of time with either color. This is not particularly practical since it involves first the determination of the total necessary exposure, some calculation in order to divide this total exposure time into two suitable portions for the yellow and blue exposure respectively, and finally a double exposure with the two proper respective exposure times.

A more convenient method has been developed which provides a series of ten filters starting with the pure yellow ranging through the intermediate combinations and ending with the pure blue. The filters are supposed to be balanced in such a way that the total exposure time remains substantially constant, whereas the contrast of course is affected. In practice it has been found that the exposure times are not nearly as constant as desirable, but the method is nevertheless more convenient than the first one.

Both methods suffer from the disadvantages inherent to the use of filters. These disadvantages are briefly the following:

Filters are available as gelatin filters or as glass filters and they can be placed in front of the lens or somewhere else in the optical system, preferably, in front of the condenser. If gelatin filters are used and placed in front of the lens they will be reasonably satisfactory as long as they are clean, but they will not stay clean for a very long time. If glass filters are used and placed in front of the lens a very high quality will be required since otherwise the sharpness of the image will be affected. High quality glass filters are so expensive that to use a set of ten for contrast control is quite impractical. If filters are placed in front of the condenser a filter of much lower quality can be used since it now will no longer affect the sharpness of the image. However, the filter will now be exceedingly large and even a low grade filter will be quite expensive. All filters in general, if used with the conventional Tungsten lamp, prolong the exposure time by a factor of approximately 4 to 5 which is a serious disadvantage whenever a high enlarging ratio or dense negatives are being used.

It is the object of the invention to overcome these disadvantages by the use of gaseous conductor lamps or fluorescent lamps. Lamps of this type can be obtained in a large variety of colors and can be shaped in the form of a grid so that a large area, i. e., the area of the negative film can be uniformly and evenly illuminated. The efficiency of these lamps is considerably higher than the efficiency of Tungsten lamps, and their light output, particularly in the green and blue region, is so high, and due to their shape they can be placed so close to the film, that even without a condenser a satisfactory light intensity can be obtained. This makes it practical to eliminate the condenser, resulting in a much smaller and much more compact enlarger.

Another object of the invention is the provision in a multicolor light source for the purpose mentioned, of a simple control system, whereby the intensity of the different colored lamps may be varied in such a way that any lamp may operate alone or all of them together with different degrees of intensity, preferably, in such a way that the total degree of intensity of all lamps combined will always remain the same so that the exposure time will be practically constant with different wave lengths of light.

Still further objects will become apparent in the following specification and the accompanying drawings in which a preferred embodiment of the invention is illustrated, and in which Fig. 1 is a perspective view of a grid of two fluorescent lamps, interleaved in a way to insure uniform illumination over the area of the negative;

Fig. 2 is a plan view of the grid shown in Fig. 1 with the negative area in the enlarger indicated diagrammatically only;

Fig. 3 is a circuit diagram embodying the control means for the grid illustrated in Figs. 1 and 2 according to the basic principles of the invention; and Fig. 4 is a modified circuit diagram.

Fig. 5 shows another modified circuit diagram.

10 in Figs. 1 and 2, is a gaseous conductor or fluorescent lamp emitting a blue light. The lamp is meander-shaped to form part of a grid consisting of legs 11, 12, 13 and 14, joined by legs 15, 16 and 17. Legs 11, 12, 13 and 14 are turned upwardly at one of their ends where they are joined by legs 15 and 17, while opposite ends of legs 12 and 13 are joined by legs 16 in the same plane. 18 and 19 are electrodes of the lamp 10.

Similarly, 10a is a gaseous conductor or fluorescent lamp emitting a green light shaped similar to lamp 10 having legs 11a 12a, 13a and 14a disposed between legs 11, 12, 13 and 14 of lamp 10. Leg 15a joins upturned ends of legs 11a and 12a, and leg 17a joins upturned ends of legs 13a and 14a, while leg 16a joins opposite ends of legs 12a and 13a in the same plane. 18a and 19a are electrodes of the lamp 10a.

Both lamps 10 and 10a form an interleaved grid in which the legs of the two lamps are uniformly spread and in the same plane over the entire area of the negative the size of which is shown diagrammatically at 20 in Fig. 2. The ends of the legs of the lamps projecting beyond the area of the negative are usually painted black so as to effect a grid of uniform intensity over a given area, or, as customary in photographic enlargers, the opening in the lamp housing from which the rays of light emanate is sufficiently small to cut off the light from the irregular extreme ends of the grid.

In Fig. 3 is shown the diagram of a circuit adapted to control the intensity of lamps 10 and 10a, the lamp grid also being shown diagrammatically only. In this circuit the secondary coil of a high voltage transformer 21 is connected on one side to the sliding contact of a potentiometer 22. The two free ends of the potentiometer are connected to the electrodes 19 and 19a of the two lamps. The other two electrodes 18 and 18a of the lamps are connected jointly to the second terminal of the secondary coil of the high voltage transformer 21. It will be clear that, if the sliding contact of the potentiometer is moved, the intensity of the two lamps will vary. For example, the intensity of the blue color will increase while the intensity of the green color will decrease, and vice versa. In other words, it will be possible to obtain either a green or a blue light, or any mixture thereof, while the total intensity of the light will remain practically the same. Thus the total exposure time in enlargers remains substantially constant and the color merely, and therefore the contrast range of paper, is affected.

While I have shown the sliding contact of the potentiometer connected to the secondary coil of a high voltage transformer, this contact may also be connected to the primary coil of the transformer by providing two high voltage transformers in the circuit, one for each lamp. A circuit diagram illustrating such an arrangement is shown in Fig. 4. As stated, in this circuit each lamp has its own transformer numbered, respectively, 21a and 21b. The sliding contact of the potentiometer 22 is connected to one side of the line, while either of the two free ends of the potentiometer is connected to the primary coil of either high voltage transformer. The two other ends of each of the primary coils are connected jointly to the other side of the line. Either secondary coil is connected to the electrodes of one of the lamps.

While I have described and shown a lamp grid of two interleaved lamps with their exposed legs in the same plane so that the negative area will be illuminated uniformly, it may be desirable to use lamps of different intensity. In such case, the one producing the high intensity may advantageously be mounted above the one producing the lower intensity in order to produce approximately the same intensity in the film plane below.

It is also obvious that, while I have shown the control means and the grid as applicable to two colors only, more than two colors could be used. Also in place of gaseous conductors or fluorescent lamps, conceivably other suitable sources of light such as, for example, incandescent lamps of suitable shape may be employed.

Moreover, instead of the control means shown, it is possible to use two independent sliding rheostats which are mechanically connected. The sliding contact may be operated by the same rotating shaft. Any other known means of electrical control could be used should this be found desirable; such as variable choke coils, autotransformers, thyratron tubes, saturable reactors, and others.

Fig. 5 shows such a wiring diagram employing two independent sliding rheostats 30 and 31 which are mechanically connected and in which the sliding contacts 32 and 33 are operated by the same rotating shaft 34. Each of the rheostats 30 and 31 have five steps numbered 1 to 5 as shown in the drawings and the arrangement is such that the contact arms 32 and 33 keep in step and contact the correspondingly numbered contacts 1 to 5 of the rheostats. The system shown in this figure, like that shown in Fig. 4, is designed to operate on 110 volts with the step up transformers providing about 3000 volts as shown in Fig. 4. As in Fig. 4, a separate transformer is provided for each lamp and a rheostat is disposed in series with the primary of each transformer. The resistance of the rheostat is distributed between the contacts 1 to 5 as shown in the drawings. Thus contact 1 in rheostat 31 is the off position, whereas contact 1 in rheostat 30 provides a direct connection between the primary and the source. In this position lamp 10 will be off and lamp 10a will be on at full intensity. When the rheostats are moved to position 2, rheostat 30 will include 80 ohms and rheostat 31 will include 400 ohms. This will reduce the light intensity of lamp 10a and this will be compensated by the light intensity of lamp 10 so that the total light intensity of the two lamps will be substantially the same as the light intensity of lamp 10a when both rheostats occupy position 1. Similarly, on the next step, rheostats 30 and 31 will each include 180 ohms and the light intensity of the two lamps will be the same and will together again give substantially the same total light intensity. Position 4 corresponds to position 2 except that the intensities of the two lamps are reversed; and position 5 corresponds to position 1 with the total light intensity remaining substantially the same, all of its being derived from lamp 10.

Various other changes in the minor details and disposition of parts may obviously be resorted to without departing from the principles or sacrificing any of the advantages of the invention as defined in the appended claims.

What I claim as new, is:

1. A multicolor light source for photographic enlargers comprising a plurality of gaseous conductor lamps emitting light of different colors, and electrical control means for said lamps to vary the intensity of the lamps in degrees varying from each other including a high voltage transformer for each lamp having primary and secondary coils, one end of each of said primary coils being connected to each other and to one side of a power line, and variable resistor means connected between the other ends of said primary coils, the said secondary coil of each transformer being connected to electrodes of each of the lamps, the said variable resistor means having movable contact means connected to the other side of the power line.

2. A multicolor light source for photographic enlargers comprising two gaseous conductor lamps emitting light of different colors, and electrical control means for said lamps to vary the intensity of the lamps in degrees varying from each other including a high voltage transformer for each lamp having primary and secondary coils, the free ends of each of said secondary coils being connected to electrodes of either one of said lamps, one free end of each of said primary coils being connected to one side of a power line, and variable resistor means having movable contact means connected to the other side of the line, and the other free ends of each of said primary coils being connected to said resistor means.

3. A multicolor light source for photographic enlargers comprising two sealed tubes forming two gaseous conductor lamps emitting light of different colors, and electrical control means for said lamps to vary the intensity of the lamps in degrees varying from each other including a high voltage transformer for each lamp having primary and secondary coils, the free ends of each of said secondary coils being connected to electrodes of either one of said lamps, one free end of each of said primary coils being connected to one side of a power line, and variable resistor means having movable contact means connected to the other side of the line, and the other free ends of each of said primary coils being connected to said resistor means.

4. A multicolor light source for photographic enlargers comprising a plurality of different colored gaseous conductor lamps, each lamp consisting of a meander-shaped tube, some of the legs of the tubes being coplanar and interleaved with each other and forming a grid of substantially uniformly spaced illuminating bars, the adjacent bars emitting light of different colors, a source of electric power, and high voltage transformer means and variable resistor means operatively interposed between said power source and said lamps, said resistor means and said transformer means cooperating to supply voltage to each of said lamps to produce a desired total light intensity, the resistor means serving to vary the voltage applied to each lamp to vary the light intensity of each lamp while maintaining the total light intensity at the desired level and comprising a rheostat for each lamp and a single rotating shaft for operating said rheostats.

ALFRED SIMMON.